United States Patent [19]

Shinozaki et al.

[11] Patent Number: 4,974,006
[45] Date of Patent: Nov. 27, 1990

[54] CAMERA LENS DRIVING DEVICE

[75] Inventors: Nobuo Shinozaki; Hiroto Tsuyuki, both of Tokyo, Japan

[73] Assignee: Seikosha Co., Ltd., Tokyo, Japan

[21] Appl. No.: 457,074

[22] Filed: Dec. 26, 1989

[30] Foreign Application Priority Data

Dec. 26, 1988 [JP] Japan ................... 63-168006

[51] Int. Cl.$^5$ .......................................... G03B 13/00
[52] U.S. Cl. ...................... 354/400; 354/439; 354/234.1
[58] Field of Search .................. 354/400–409, 354/439, 195.1, 234.1

[56] References Cited

U.S. PATENT DOCUMENTS 4,868,596 9/1989 Ishida et al. .............. 354/400 X
4,881,096 11/1989 Ogihara et al. ............ 354/400

Primary Examiner—L. T. Hix
Assistant Examiner—David M. Gray
Attorney, Agent, or Firm—Jordan & Hamburg

[57] ABSTRACT

A lens driving device for an auto-focusing camera includes a lens driving member biased to move in one direction, a ratchet wheel having a plurality of teeth and rotatably associated with the lens driving member, a rockable retaining member having two pawl portions alternately engaging the teeth of the ratchet wheel, an electromagnet for controlling the rocking motions of the retaining member, and a control circuit for outputting a signal to the electromagnet to control the biased movement of the lens driving member.

20 Claims, 3 Drawing Sheets

STEP MOTOR

MOVING MEMBER

LENS DRIVING MEMBER

ELECTROMAGNET

CAMERA LENS DRIVING DEVICE

BACKGROUND OF THE INVENTION

1. Field of the Invention

The present invention relates to a lens driving device for an auto-focusing camera.

2. Description of the Prior Art

The camera lens driving device of the prior art is exemplified in Japanese Patent Laid-Open No. 62-200339. According to this camera lens driving device, in order that a lens driving member associated with a step motor may be stopped at a focal point, a retaining member for retaining the teeth of a ratchet wheel associated with the lens driving member is caused to retain the teeth of the ratchet wheel, when the step motor rotates to bring the lens driving member to the focal point, by an electromagnet thereby to restrain the lens driving member from further movement.

However, the camera lens driving device of the prior art is troubled by the following problem. Because of the errors of the step angle of the step motor and/or the accumulated errors of the clearance due to the insufficient accuracy in the parts or the assembly of the power train from the step motor through the gear train (e.g., the idler gear), the moving member and the lens driving member to the ratchet wheel, the engagement between the ratchet wheel and the retaining member may not occur at the proper position thereby making the focusing improper.

Therefore, a camera such as a multi-focal lens camera needing many lens stop positions is newly required to have means for stopping the lens driving member accurately in the many lens stop positions. This requirement is difficult to be satisfied within the limited operational space of the lens driving member and may increase the size of the camera.

In order to stop the lens driving member accurately at the focal point, moreover, the clearance has to be reduced by improving the accuracy of the parts of their assembly but this is limited. In accordance with the number of the lens stop positions, still moreover, the ratchet wheel has to be enlarged to raise another problem that the camera is also large-sized.

SUMMARY OF THE INVENTION

It is, therefore, an object of the present invention to provide a camera lens driving device which is free of the aforementioned problems.

According to the present invention, there is provided a camera lens driving device comprising: a lens driving member biased to move in one direction; a ratchet wheel having a plurality of teeth and associated with the lens driving member to rotate; a retaining member made rockable and having two pawl portions alternately meshing with the teeth of the ratchet wheel; an electromagnet for controlling the rocking motions of the retaining member; and a control circuit for outputting a signal to the electromagnet to control the biased movement of the lens driving member.

According to the camera lens driving device thus described, the rocking motion of the retaining member is controlled by the electromagnet which in turn is controlled by the signal outputted from the control circuit. As a result, the retaining member has its two pawl portions alternately engaging with the teeth of the ratchet wheel by a predetermined number of times until its rocking motions are interrupted. Thus, the lens driving member biased to move in one direction can be stopped accurately at the focal point through the ratchet wheel.

Thus, the retaining member is so controlled through the electromagnet by the control circuit that its pawl portions control the teeth of the ratchet wheel step by step to rotate intermittently. As a result, the ratchet wheel is stopped without fail after a predetermined number of steps independently of the step motor. Thus, it is possible to avoid the disadvantage of the prior art due to the step angle errors of the step motor.

Moreover, the lens driving member is stopped by the meshing engagement with the stopped ratchet wheel while being biased in the one direction by a tension spring. As a result, it is possible to absorb the accumulated errors of the prior art in the clearance due to the accuracy of the parts and/or the assembly of the gear train from the step motor to the ratchet wheel. Thus, the lens driving member can be stopped accurately at the focal point.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENTS

Figure 1:
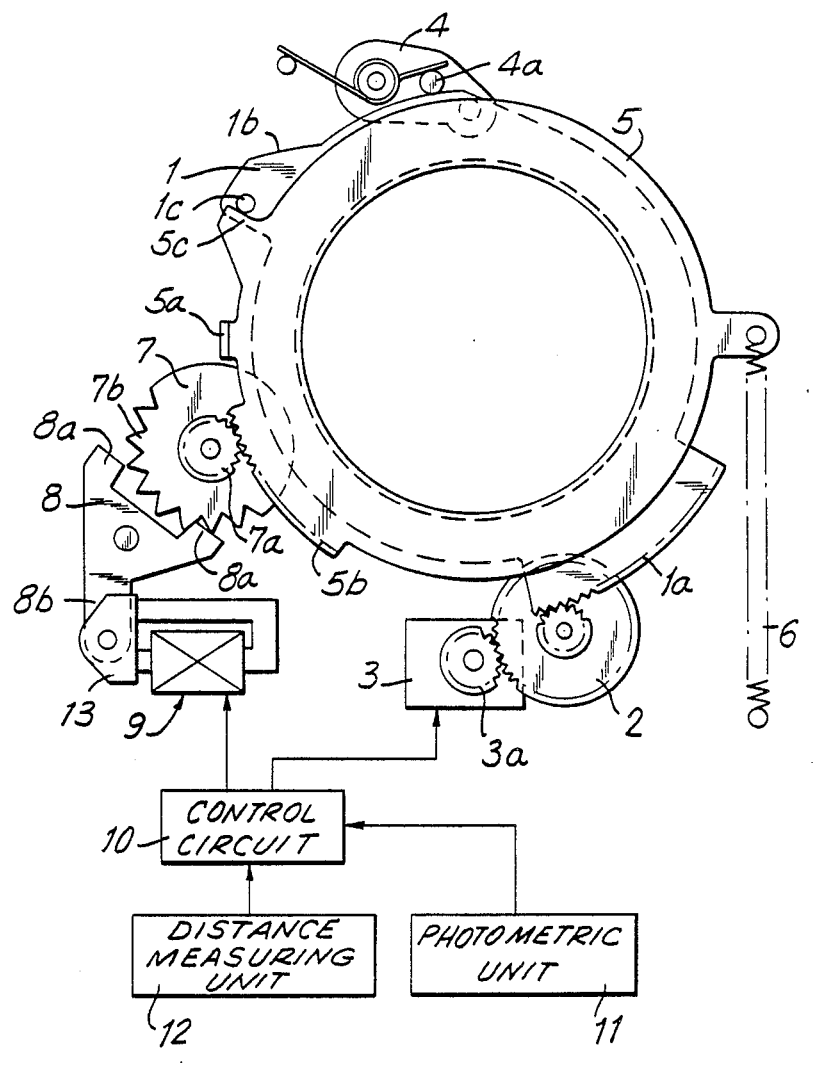
FIG. 1 is a schematic diagram showing a first embodiment of the camera lens driving device before released according to the present invention.
Figure 2A:
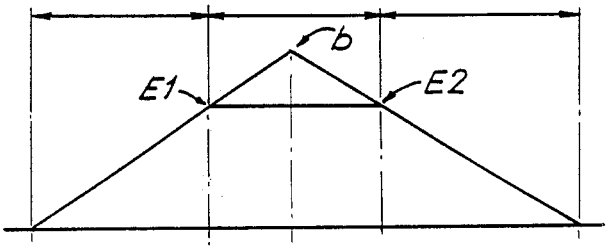
FIG. 2 is a diagram showing the operations of a step motor, a moving member, a lens driving member and an electromagnet, respectively, at (A) to (D)
Figure 2B:
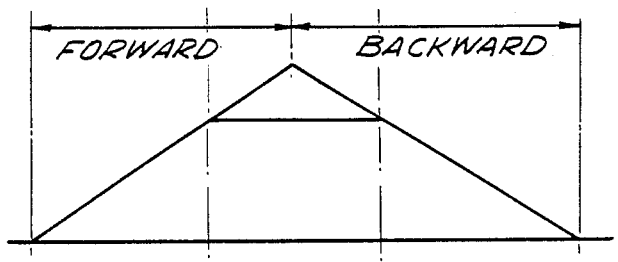
Figure 2C:
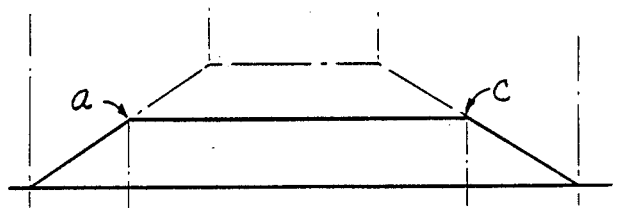
Figure 2D:
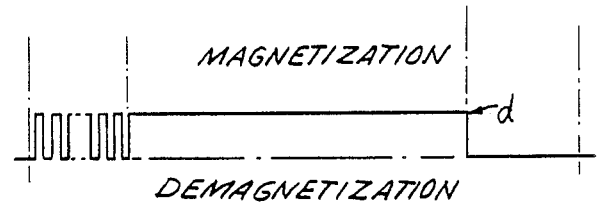

The present invention will now be described with reference to the accompanying drawings. FIGS. 1 and 2 show the first embodiment of the camera lens driving device according to the present invention.

FIG. 1 is a schematic diagram showing the lens driving device before it is released. Designated at reference numeral 1 is a moving member which is formed at its outer circumferential edge with: a gear portion 1a meshing through an idler gear 2 with a pinion 3a fixed on the output shaft of a step motor 3; a sector opening/closing cam 1b engaging with a pin 4a of a sector control lever 4 in an exposing region; and a pin 1c meshing with a later-described lens driving member 5. This lens driving member 5 is formed at its outer circumferential edge with: a projection 5a adapted to engage with a non-illustrated camera lens; a gear portion 5b meshing with a later-described ratchet wheel 7; and an abutting portion 5c adapted to engage with the pin 1c when the moving member 1 is rotated counterclockwise. Moreover, the lens driving member 5 is biased to rotate clockwise by the action of a tensile spring 6.

The ratchet wheel 7 is supported rotatably and is formed with: a pinion portion 7a meshing with the gear portion 5b of the lens driving member 5; and a plurality of teeth 7b having a relation to a later-described retaining member 8.

This retaining member 8 is supported in a rocking manner and is formed with: two pawl portions 8a adapted to engage with teeth 7b of the ratchet wheel 7;

and an arm 8b for supporting an iron member 13 which is made of a magnetic material for coating with a later-described electromagnet 9.

This electromagnet 9 can be magnetized and demagnetized by drive pulses (or signals) coming from a later-described control circuit 10, to attract the iron member 13 when it is magnetized.

The control circuit 10 is made operative to output both drive pulses, that is drive pulses which are determined by the film sensitivity information and the object luminance information from a photometric unit 11 and which are fed to the step motor 3 and drive pulses which are determined by distance information obtained from a distance measuring unit 12, and which are fed to the electromagnet 9.

The pawl portions 8a of the retaining member 8 are so related that when one of them is within the locus of rotation of the teeth 7b of the ratchet wheel 7 the other is positioned outside of the locus of rotation, thus providing an escapement in which the relation is reversed when the retaining member 8 rocks.

When the electromagnet 9 is in its deenergized state, the retaining member 8 is caused to repeat its rocking motion through the ratchet wheel 7 by the tensile spring 6 which biases the lens driving member 5 rotationally. When in the magnetized state, the electromagnet 9 attracts and fixes the iron member 13 thereby to control the rotation of the lens driving member 5 through the retaining member 8 and the ratchet wheel 7.

The operations of the first embodiment thus constructed will be described with reference to the following additional operation diagram of FIG. 2.

By the operation of a non-illustrated release, drive pulses to the step motor 3 and the electromagnet 9 are determined by the control circuit 10 in accordance with the information from the photometric unit 11 and the distance measuring unit 12 and are outputted from the control circuit 10 to the step motor 3 and the electromagnet 9. First of all, as shown at (A) and (B) in FIG. 2, the step motor 3 rotates forward to turn the moving member 1 clockwise. Then, the lens driving member 5 is biased clockwise by the tensile spring 6. At the same time, the electromagnet 9 is repeatedly energized and deenergized by the drive pulses coming from the control circuit 10 to rock the retaining member 8 back and forth. Thus, the lens driving member 5 starts its clockwise rotation through the ratchet wheel 7. After this, the electromagnet 9 ends the repetitions of the magnetization and demagnetization by the predetermined drive pulses from the control circuit 10. Then, a drive pulse for continuing the magnetization is outputted from the control circuit 10. This state is held after the operation of the retaining member 8, the ratchet wheel 7 and the lens driving member 5 are stopped (as indicated at a in FIG. 2(C)) and until the non-illustrated camera lens is focused to complete the exposure.

Even after the operation of the lens driving member 5 is stopped, the clockwise rotation of the moving member 1 is continued by the forward rotation of the step motor 3 until the exposure region is reached (as indicated at E1 in FIG. (2A)). The step motor 3 is further rotated forward by the drive pulses of the control circuit 10 determined by the object luminance information so that the pin 4a of the sector control lever 4 comes into engagement with the sector opening/closing cam 1b of the moving member 1. As a result, the sector control lever 4 is turned counter-clockwise to open non-illustrated sectors gradually for effecting the exposure. At the instant (as indicated at b in FIG. 2(A)) when an aperture matching the proper exposure is formed, the step motor 3 is rotated backward by the backward drive pulses for the control circuit 10. As a result, the moving member 1 is rotated counter-clockwise to close the sectors thereby to complete the exposure (as indicated at E2 in FIG. 2(A)).

After this, the step motor 3 continues its backward rotation to return the moving member 1 to its initial position. At the instant (as indicated at c in FIG. 2(C)) when the pine 1c of the moving member 1 comes into contact with the abutting portion 5c of the lens driving member 5, the electromagnet 9 is demagnetized (as indicated at d in FIG. 2(D)) by the control circuit 10, and the retaining member 8 is allowed to rock freely. As a result, the lens driving member 5 is rotated counter-clockwise together with the moving member 1 while charging the biasing force of the tensile spring 6, until the operation is ended when the step motor 3 is stopped.

Figure 3:
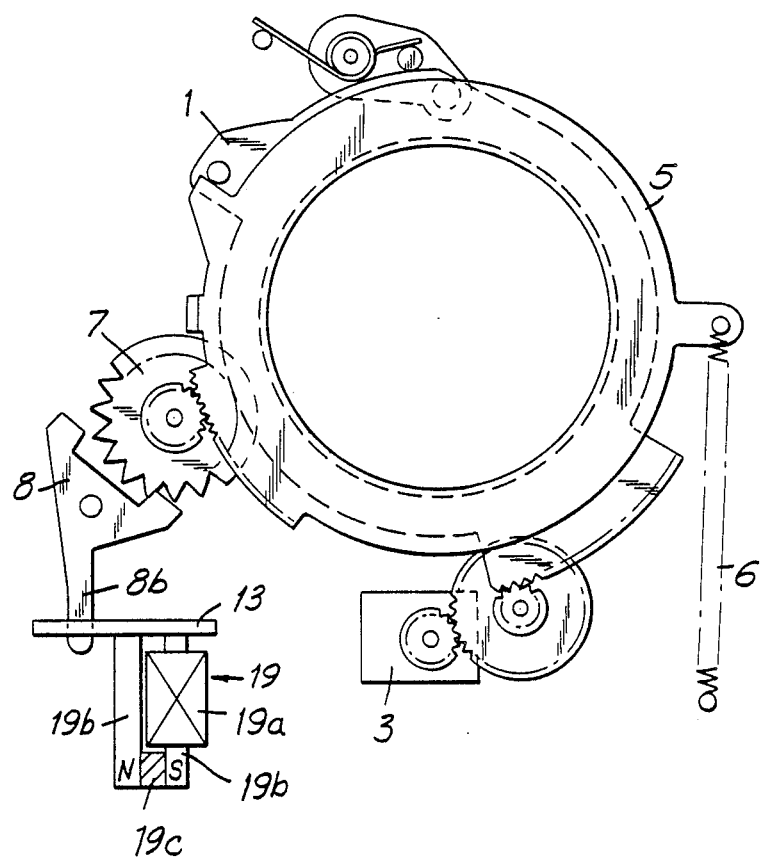
FIG. 3 is a schematic diagram showing a second embodiment of the camera lens driving device according to the present invention.

FIG. 3 shows a second embodiment of the present invention. In this embodiment, the ratchet wheel 7 and the retaining member 8, which are associated with the lens driving member 5 biased clockwise by the tensile spring 6, are constructed like the first embodiment. In FIG. 3 the retaining member 8 has an arm 8b which engages the iron member 13 which is attractable by an electromagnet 19 and supported to move horizontally by non-illustrated means. Like the first embodiment, the electromagnet 19 is composed of: a coil 19a connected with a non-illustrated control circuit (which can be the same control circuit as shown in FIG. 1); two magnetic cores 19b; and a permanent magnet 19c sandwiched between the magnetic cores 19b and magnetized to have N and S poles. When the coil 19a is deenergized, the iron member 13 is attracted to the magnetic cores 19b by the magnetic force of the permanent magnet 19c. When the coil 19a is energized, the magnetic force of the permanent magnet 19c is demagnetized to release the attraction of the iron member 13 from the magnetic cores 19b. When the electromagnet 19 is not operated, the magnetic cores 19b attract and fix the iron member 13 which controls the operation of the retaining member 8, the ratchet wheel 7 and the lens driving member 5. When the electromagnet 19 is operated, the iron member 13 can be operated in the horizontal direction so that the lens driving member 5 can be operated through the retaining member 8 and the ratchet wheel 7. These operations are similar to those of the first embodiment.

According to the second embodiment, the electromagnet 19 can attract the iron member 13 no matter which of the two end positions of the rocking range might be taken by the arm 8b of the retaining member 8. As a result, the step angles of the ratchet wheel 7 and the lens driving member 5 can be halved to provide an advantage in the design that the number of lens stops is increased and that the device is made compact.

The structure, like the first embodiment, in which the biasing force of the spring for rotating the lens driving member 5 is applied through the moving member 1 to the step motor 3, is held against the biasing force of the spring, when the camera is not used, by the magnetic coupling force of the non-illustrated stator and rotor of the step motor 3. When shocks are applied to the camera, there may arise a malfunction in which the balance is lost and thereby damage the magnetic phase relation between the stator and the rotor so that the initial position is moved to make the operations inaccurate. According to this second embodiment, on the contrary, the electromagnet 19 attracts the iron member 13 when it is deenergized, so that the operations of the retaining member 8, the ratchet wheel 7 and the lens driving member 5 are controlled when the camera is not used. Thus, the aforementioned malfunction can be prevented.

The moving member 1 in the foregoing embodiments accomplishes both the focusing and exposing operations by the step motor 3. However, the present invention may be applied to a camera which is used for accomplishing only a focusing operation.

The drive source need not be limited to the step motor but may be exemplified by a bi-directional DC motor or ultrasonic motor.

The structure may be modified such that the spring is charged up by returning the lens driving member 5 manually to the initial position.

In order that the lens driving member 5 in the first embodiment may be prevented from being rotated by the biasing force of the tensile spring 6 after the return, the lens driving member 5 in the initial position may be retained by another member and released by the releasing operation of the camera.

As has been described hereinbefore, according to the camera lens driving device of the present invention, the ratchet wheel is stopped without fail after the predetermined steps independently of the step motor. Thus, it is possible to prevent the disadvantage which might otherwise be caused in the prior art due to the errors of the step angle of the step motor.

Moreover, the lens driving member is stopped by the meshing engagement with the stopped ratchet wheel while being biased in the one direction by the tensile spring. Thus, the accumulated errors of the prior art in the clearance due to the accuracy in the individual parts and their assembly such as the gear train from the step motor to the ratchet wheel can be avoided to stop the lens driving member accurately at the focal point.

According to the second embodiment, moreover, an advantage can be achieved in the number of the lens stops and in the size reduction for the same number of stops. Even if a shock is applied to the unused camera, it is possible to prevent a malfunction due to the displacement of the initial position of the step motor.

Although the present invention has been described through specific terms, it should be noted here that the described embodiment is not necessarily exclusive and that various changes and modifications may be imparted thereto without departing from the scope of the invention which is limited solely by the appended claim.

What we claim is:

1. A camera lens driving device comprising:
   a lens driving member biased to rotate in one direction;
   a ratchet wheel having a plurality of ratchet teeth and operably rotatable with said lens driving member;
   a retaining member having pawl portions and being mounted for back and forth rocking movement in which said pawl portions alternately engage said ratchet teeth;
   electromagnetic means operable to control the rocking movement of said retaining member; and
   control circuit means outputting a signal to said electromagnet means to control the rocking movement of said retaining member to thereby control the rotation of said lens driving member.

2. A camera lens driving device according to claim 1 further comprising a rotatable movable member, said movable member being rotatable in a direction opposite to said one direction to engage and rotate said lens driving member in said opposite direction.

3. A camera lens driving device according to claim 2 further comprising a biasing means biasing said lens driving member in said one direction, said biasing means having its biasing force restored by rotation of said movable member in said opposite direction.

4. A camera lens driving device according to claim 3 wherein said movable member is rotated to one position to restore said biasing force of said biasing means, said movable member being rotatable in said opposite direction from said one position to an intermediate position, said movable member being rotatable back and forth from said intermediate position to a third position to effect an exposure operation, said retaining member being rocked back and forth when said movable member is in said intermediate position such that during said rocking movement, said lens drive member is advanced to a desired stop position determined by said control means.

5. A camera lens driving device according to claim 4 further comprising a step motor for rotating said movable member.

6. A camera lens driving device according to claim 1 further comprising a spring means for biasing said lens driving member in said one direction, a rotatable movable member rotatable in a direction opposite to said one direction to engage said lens driving member and effect tensioning of said spring means.

7. A camera lens driving device according to claim 6 further comprising a step motor for rotating said movable member, and cam means on said movable member for effecting exposure operation when said movable member is rotated back and forth by said step motor.

8. A camera lens driving device according to claim 7 wherein said movable member has an engageable part engageable with said lens drive member to rotate said lens drive member in said opposite direction when said movable member is rotated in said opposite direction by said step motor.

9. A camera lens driving device according to claim 8 wherein said lens driving member has engageable means operable to engage the camera lens, a gear portion meshing with said ratchet wheel, and an abutting portion engageable with said engageable part of said movable member to rotate said lens driving member in said opposite direction.

10. A camera lens driving device according to claim 1 further comprising biasing means biasing said lens drive member in said one direction, said rocking movement of said retaining member operating as a control escapement to control the rotation of said lens driving member in said one direction by said biasing means.

11. A camera lens driving device according to claim 1 wherein said control means is operable to effect repeated magnetization and demagnetization of said electromagnetic means to thereby control the rocking movement of said retaining member such that the number of said repeated magnetizations and demagnetizations controls the rotational positioning of said lens driving member.

12. A camera lens driving device according to claim 1 wherein said electromagnetic means comprises a core means and a coil means, said control means outputting a signal to said electromagnetic means to effect energization of said coil means and magnetization of said core means, said retaining member being rocked to one of its rocked positions upon magnetization of said core means.

13. A camera lens driving device according to claim 1 wherein said electromagnetic means comprises a permanent magnet means and a coil means, said permanent magnet means attracting said retaining member to one of its rocked positions when said coil means is deenergized, said control means outputting a signal to said electromagnetic means to effect energization of said coil means and demagnetization of said permanent magnet means, said retaining member being rocked to one of its rocked positions upon demagnetization of said permanent magnet means.

14. A camera lens driving device according to claim 2 wherein said control means comprises distance measuring means, said control means being operable to output signals to said electromagnetic means responsive to said distance measuring means.

15. A camera lens driving device according to claim 14 further comprising a step motor for rotating said movable member, said control means comprising photometric means responsive to film sensitivity and to luminance information of the object being photographed, said control means being operable to output signals to said step motor responsive to said film sensitivity and to said luminance information.

16. A camera lens driving device comprising:
a rotatable lens drive means;
biasing means biasing said lens drive means in one rotatable direction;
escapement means operable to be rocked back and forth in a rocking motion to control rotation of said lens drive means by said biasing means such that the number of rocking motions determines the amount of rotation of said lens drive means; and
control means for controlling said escapement means to thereby control the rotational positioning of said lens drive means.

17. A camera lens driving device according to claim 16 wherein said escapement means comprises a ratchet wheel having ratchet teeth and operably rotatable with said lens drive means, and pawl means rotatable back and forth to effect escapement of said ratchet teeth.

18. A camera lens driving device according to claim 16 further comprising a drive member and a step motor driving said drive member, said step motor and said drive member being operable to effect restoration of the biasing force of said biasing means.

19. A camera lens driving device according to claim 18 wherein said drive member has cam means operable to effect exposure operation when said drive member is rotated back and forth by said step motor.

20. A camera lens driving device according to claim 16 wherein said control means comprises electromagnetic means operable to effect said rocking movement of said escapement means, said control means further comprising distance measuring means for measuring the distance to an object being photographed, said control means being operable to output signals to said electromagnetic means responsive to said distance measuring means.

* * * * *